Sept. 8, 1970  R. M. FISHER  3,527,441
EXTERNAL VALVE ADJUSTMENT MEANS
Filed Oct. 6, 1967
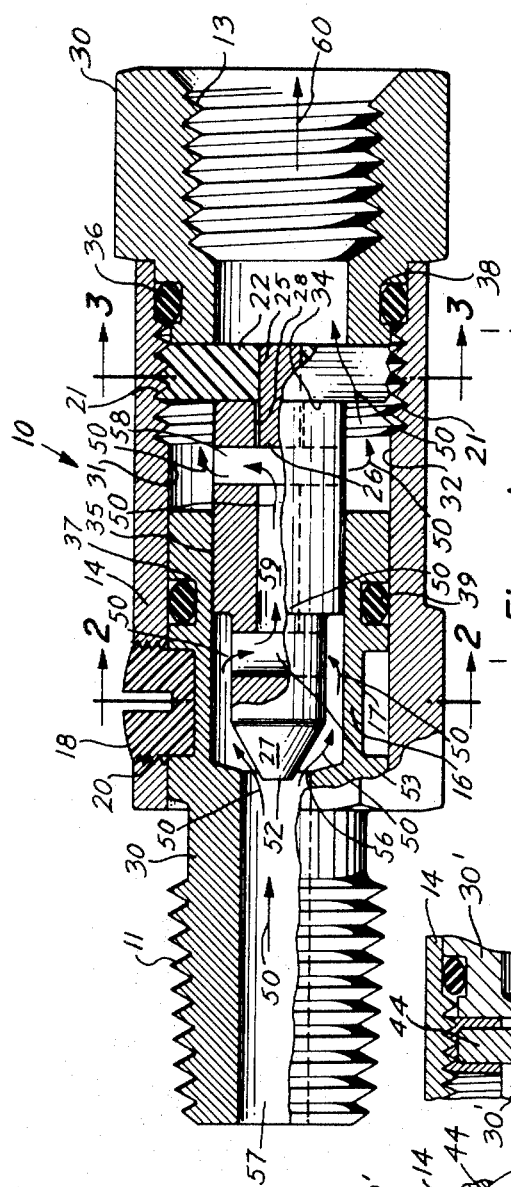
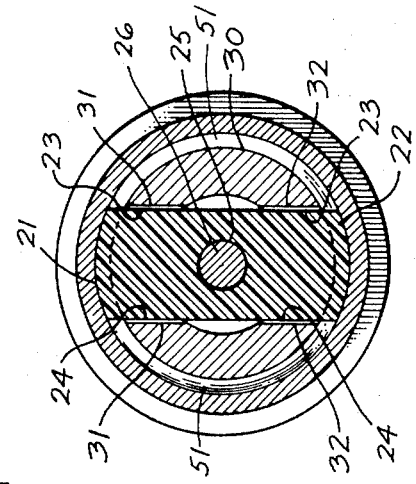
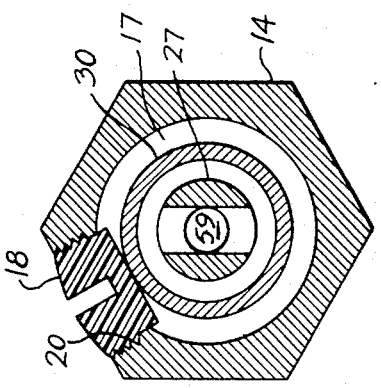
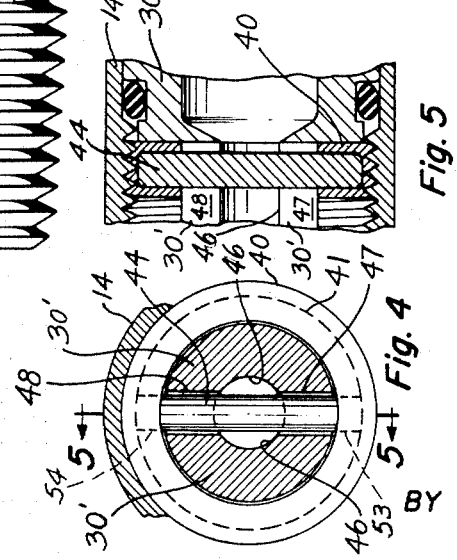
ROBERT M. FISHER
INVENTOR.
BY *Norman L. Chalfin*
AGENT.

United States Patent Office 3,527,441
Patented Sept. 8, 1970

3,527,441
EXTERNAL VALVE ADJUSTMENT MEANS
Robert M. Fisher, 20966 Las Flores Mesa Drive,
Malibu, Calif. 90265
Filed Oct. 6, 1967, Ser. No. 673,355
Int. Cl. F16k *31/44*
U.S. Cl. 251—347                4 Claims

ABSTRACT OF THE DISCLOSURE

This invention provides a means for externally adjusting the internal parts of a pressurized in-line valve.

BACKGROUND OF THE INVENTION

In the prior art, valve devices are provided with means by which the various elements therein are adjusted for purposes of setting the operating point of the valve.

The in-line valve is one of such prior art devices which in the past has included an internal screw or a similar device which requires a tool to be inserted into it for adjustment of the operating point.

THE PRESENT INVENTION

The present invention with only an external manually adjustable ring or barrel provides a simple and efficient operating point setting means for in-line valves.

A barrel with small section of the inner circumference thereof threaded is made captive and rotatable on a valve cylinder assembly in which a barrier element in the form of a novel central flat sided screw or a threaded ring is inserted. The barrier element is arranged to ride in diametrally opposed rectangular slots in the valve cylinder while its threads interfitted with the threads of the inner circumference of the outer barrel provides motive means for setting the positions of the flat sided screw within the barrel as the barrel is rotated. Any internal pressure setting or flow aperture positioning element within the cylinder bore may be arranged to fit against the screw or ring barrier element or be pinned on a common shaft with the flat sided screw. The screw or ring is thereby positioned within the cylinder for adjustment thereof to form a barrier against which any one of a number of types of positioning elements may butt to limit the movement of the element within the cylinder bore.

IN THE DRAWINGS

FIG. 1 is a partially cross-sectional view of a valve device incorporating this invention;

FIG. 2 is a cross-section through 2—2 of FIG. 1;

FIG. 3 is a cross-section through 3—3 of FIG. 1;

FIG. 4 is a lateral cross-section of an alternative embodiment of the invention; and FIG. 5 is a cross-section of a lateral portion through 5—5 of FIG. 4.

In FIG. 1 a valve assembly 10 is shown including an inner cylinder 30 with an externally threaded nipple 11 on one end of said cylinder 30. A barrel 14 is fitted over and rotatable about cylinder 30. A portion 16 of nipple 11 within cylinder 14 in undercut as at 17 to receive a set screw 18 inserted into a threaded bore 20 in barrel 14. O-ring grooves 37, 38 are also cut in the outer surface of cylinder 30 to hold O-rings 39, 36 sealably against the inner surface of barrel 14.

A portion 21 of barrel 14 is threaded internally to receive a novel flat sided screw 22 which is the heart of this invention. Inner cylinder 30 is provided with rectangular slots along an axial line on diametrally opposite surfaces 31, 32 to receive the flat sides of screw 22.

Screw 22 is flattened to form parallel sides 23, 24 as shown in FIG. 3. It has an aperture 25 through the center thereof to receive a pin 26 tightly fitted therein. A typical setting element 27 within barrel 14 butts against the surface 34 of screw 22 and has an aperture 28 therein which is aligned with aperture 25 in flat sided threaded screw 22 to receive pin 26. Pin 26 acts to align the parts within cylinder 30.

The valve according to the invention is assembled as shown in FIG. 1 as follows which should be clear to those skilled in valve arts: The flat-sided screw 22 is inserted into cylinder 30 in the diametrally opposed grooves 31, 32 so that the pin 26 faces the nipple end at 11. Note in the cross section shown in FIG. 3 that the sides 23, 24 of flat-sided screw 22 are free to slide along grooves 31, 32. Prior to the insertion of screw 22 valve setting element 27 had been inserted into the bore 35 provided therefor in cylinder 30. The pin 26 of screw 22 is inserted into and aligns with hole 28 in setting element 27. It is necessary for hole 28 to permit the insertion of pin 26 and is therefore not a tight fit as is hole 25 for pin 26. Now, when cylinder 30 with setting element 27 inserted therein and screw 22 in slots 31, 32 is inserted via nipple and 11 into the threaded end (21) of barrel 14 it (cylinder 30) is pushed forward until the threads on flat-sided 22 engage threads 21 in barrel 14, whereupon barrel 14 is rotated so as to draw screw 22 into barrel 14 along its bore until the groove 17 about the periphery of cylinder 30 is in alignment with threaded bore 20 in cylinder 14 at which time set screw 18 is inserted so as to be engaged by its end 55 in groove (undercut) 17.

So long as set screw 18 is not cinched down on undercut groove 17 in nipple portion 16 of cylinder 30, the barrel 14 is rotatable. The flat sides 23, 24 of screw 22 prevents its rotation because these sides 23, 24 butt against the grooves 31, 32 in inner cylinder 30.

To make an adjustment of the invention one uses the thumb and forefinger to rotate the outer barrel 14 upon inner cylinder 30 which causes screw 22 to ride along the axis of the valve in slots 31, 32, the surface 34 of screw 22 forming a base against which an internal pressure controlling or other element within the bore 35 of cylinder 30 can butt.

The flow of fluids or gases through the valve above described can be followed through the arrows 50 shown in FIG. 1 and with reference also to FIG. 3. When valve setting element is free to butt against flat 34 of screw 22 and allow a passage at the valve seat 56 between the inlet 57 and nose 52 of setting element 27 as shown in FIG. 1, the fluid flow is then into bore 35 of cylinder 30, through cross bore 53 in nose 52 of setting element 27 following the arrows 50 through the central bore 59 in element 27 and through the cross bore 58 at the rear end of element 27 and out through the flat sides 23, 24 forming aperture 51 (FIG. 3) comprising the inner diameter of barrel 14 threaded at 21 but *not* engaging screw 22 and the outer diameter of cylinder 30, and thereafter through aperture 13 in cylinder 14 to a fluid line not shown but as indicated by arrow 60. If barrel 14 is rotated sufficiently the nose 52 of setting element 27 seats against seat 56 to shut off flow from nipple 11 through the valve. However rotation of barrel 14 oppositely to increase the opening between valve seat 56 and nose 52 of valve setting element 27 now permits a greater flow rate in the direction of arrows 50, 60. Thus rotation of barrel 14 to move flat-sided screw sets the flat 34 as a butt end against which the rear of setting element will be forced to seat by the fluid flow, limiting the aperture at the seat 56 and nose 52 to some predetermined volume of flow as determined by the setting of screw 22 by barrel 14. Once the setting has been made screw 18 is cinched down on groove 17 to hold that setting and thus set the valve for a predetermined rate of flow.

An alternative technique for accomplishing the adjustment capability of this invention is shown in FIGS. 4 and 5, depicting in respective cross-sections the view through an outside threaded ring 40 which performs the same function as the screw 22 which has the flat sides 23, 24. Ring 40 has unbroken threads 41 about its outer circumference. A hole or cross-bore 42–43 is drilled through the diameter of ring 40 to receive a roll pin 44 which is shorter than the outer diameter of ring 40 by twice the depth of threads about its circumference so that pin 44 can be pushed through holes 42, 43 without disturbing the engagement of threads 41 with the threads on the inner surface of outer barrel 14.

The inner cylinder 30 shown in FIG. 1 must be modified as shown at 30' in FIGS. 4 and 5 to permit ring 40 to slip thereon. The portion of cylinder 30 between the dashed lines outside FIG. 1, indicated between the ends of double arrow 45, will have the cross-section shown at 30' in FIG. 4 terminating as indicated in the cross-sectional portion thereof shown in FIG. 5. A pair of slots in cylinder 30' identified by the reference characters 47, 48, correspond to slots 31, 32 in cylinder 30. However, in the alternative embodiment of FIGS. 4 and 5 pin 44 slides in slots 47, 48 so that as outer barrel 14 is rotated the position of ring 40 along the slots 47, 48 is changed. The central bore 46 in cylinder 30' receives appropriate internal pressure- or other parameter-setting elements, or alternatively, is simply a flow space.

The screw 22 of FIGS. 1 through 3 and the ring 40 of FIGS. 4, 5 form captive movable barriers within the valve, the movement of which is accomplished by rotation of the external barrel 14. When various devices such as represented by setting element 27 are included in cylinder 30 or 30' they butt against screw 22 or ring 40 which act as limits to movement of the devices such as 27 back towards the female end 13 of the valve assembly. As screw 22 or ring 40 are moved in slots 31, 32 or 47, 48 towards the male end 11 of the valve, a device such as 27 therein can be pushed forward to become a closure element. Thus, rotation of barrel 14 in either event becomes the means by which the barrier elements 22 or 40 determine the positioning of internal devices as to some fluid flow or gas flow capability or shut-off is accomplished at some predetermined flow rate or pressure.

What is claimed as new is:

1. A means for externally adjusting the setting point of internal elements in an in-line pressurized valve, said means comprising:
   an inner cylinder within said valve having identical rectangular slots on diametrally opposed surfaces of said cylinder;
   a ring having external threads about the outer circumference thereof and a cross-bore therethrough, said ring having an inner diameter to fit over the outer circumference of a portion of said inner cylinder and a pin through both said cross-bore and said rectangular slots to hold said ring captive on said portion of said cylinder and slidable along said portion of said cylinder for the length of said slots; and
   an external barrel being fittable over and rotatable on said inner cylinder and said ring, said barrel being threaded internally for a portion thereof corresponding to the length of said slots in said cylinder, the threads being in engagement with those on the circumference of said ring,
   whereby when said external barrel is rotated about said inner cylinder and said ring, said ring is moved in said slots to form a positionable barrier within said barrel.

2. In the means for externally adjusting the setting point defined in claim 1, wherein said inner cylinder includes a pair of O-ring grooves positioned on the outer circumference thereof to receive O-rings therein and a single groove near one end thereof, said external barrel includes a threaded bore therethrough aligned over said single groove in said inner cylinder to receive a set screw, and a set screw in said threaded bore to engage said groove,
   whereby when said set screw engages said groove, said external barrel is held captive on said inner cylinder and said O-ring seals said inner cylinder and said external barrel against fluid leakage.

3. In an in-line pressurized valve
   an external barrel rotatable about the pressurized valve, being of short internally threaded sections;
   an internal cylinder having respective male and female coupling elements on opposite ends thereof and being slotted on diametrally opposite walls thereof, said cylinder being within said barrel, the internally threaded portion of said barrel being co-extensive with the slotted portion of the walls of said cylinder; and
   a barrier element having external threads engageable with the threads of said internally threaded barrel section, and having a cross bore therein with a pin through the center of said barrier element to engage said slotted section of said cylinder, to be slidable without rotation therein during rotation of said barrel about said cylinder.

4. A means for externally adjusting the setting point of internal elements in an in-line pressurized valve, said means comprising:
   an inner cylinder within said valve having identical rectangular slots on diametrally opposed surfaces of said cylinder;
   a screw having flat sides along the axis thereof and being threaded on the rounded remaining portions thereof, said screw being inserted in said slots along the axis of said cylinder;
   O-ring grooves being positioned on the outer circumference of said inner cylinder to receive O-rings therein, and a single groove near one end of said cylinder;
   an external barrel being sealably fittable over and rotatable on said inner cylinder, and being partly internally threaded to match the threads of said flat-sided screw and being in engagement therewith;
   a threaded bore through said barrel aligned over said single groove in said inner cylinder to receive a set screw;
   and a set screw in said threaded bore to engage said groove,
   whereby when said external barrel is rotated about said inner cylinder, said flat sided screw is moved in said bore to form a positionable barrier within said cylinder and said barrel is held captive on said inner cylinder by the engagement of said set screw in said single groove.

References Cited
UNITED STATES PATENTS

| | | | |
|---|---|---|---|
| 1,158,420 | 10/1915 | Schweinert et al. | 251—347 |
| 1,396,196 | 11/1921 | Hachenberg | 251—346 XR |
| 2,600,976 | 6/1952 | Dalrymple | 251—347 |
| 2,985,425 | 5/1961 | Tang | 251—340 |
| 3,093,155 | 6/1963 | Dawes | 251—340 XR |
| 3,291,440 | 12/1966 | Archer et al. | 251—340 XR |
| 3,311,342 | 3/1967 | Bering | 251—344 |
| 3,367,626 | 2/1968 | Stern | 251—340 |
| 3,374,985 | 3/1968 | Gessic | 251—347 XR |

FOREIGN PATENTS 643,096  5/1928  France.

SAMUEL SCOTT, Primary Examiner